Nov. 21, 1933.  E. C. WENTE  1,936,145
SOUND REPRODUCING SYSTEM
Filed Sept. 9, 1930

INVENTOR
E. C. WENTE
BY
G. H. Heydt
ATTORNEY

Patented Nov. 21, 1933

1,936,145

UNITED STATES PATENT OFFICE 1,936,145

SOUND REPRODUCING SYSTEM

Edward C. Wente, New York, N. Y., assignor to Bell Telephone Laboratories, Incorporated, New York, N. Y., a corporation of New York Application September 9, 1930. Serial No. 480,649

2 Claims. (Cl. 179—100.3)

This invention relates to improved apparatus for reproducing sounds photographically recorded on a film.

In a number of sound picture systems in use at the present time the reproducing of sound photographically recorded on a film is accomplished by projecting light rays of constant intensity to an opaque screen containing a slit beyond which the film is constantly in motion. The light is projected through the slit and the film to a light sensitive cell for the transformation of the light variations due to variations in density of the film into correspondingly varying electric currents, which currents are transmitted through an amplifier to a loud speaker.

A slit of this character, generally known as the physical slit or contact slit, in order that it may function properly in effecting the resolution of the photographic sound record on the film, has been placed so close to the surface of the film as to be practically in rubbing contact. Such rubbing engagement between the film and the slit block tends to mar the surface of the film and also to clog the slit with dust collected by the film. In addition to this, the material of which the slit block is made is often roughened through constant friction with the film. This roughened surface has a tendency to scratch the surface of the film and the photographic record thereon to such an extent that it is of no further value. A system including such devices therefore requires constant observation in order to maintain the slit and slit block in proper condition.

The object of this invention is to provide a sound reproducing system in which the active area of a photographic record of a film from which sounds are instantaneously reproduced is restricted by an objective lens bearing a relation to the film according to its focal length and sufficiently removed from the film surface to be free from difficulties arising from rubbing engagement.

In accordance with one embodiment of this invention a reproducing system is provided with a light source for projecting light through an unrestricted surface of a constantly moving film. An objective lens is placed on the opposite side of the film from the light source with the plane of the film in one conjugate focus thereof. The relation of the lens to the film is such that the light rays from a restricted illuminated area of the film approximately one mil in height or dimension in the direction of travel of the film are concentrated at an alternate conjugate focus of the lens between said lens and a light sensitive cell. The light rays are projected through this alternate conjugate focus to a secondary lens and thence to the light sensitive cell. The secondary lens defines the area of the cell sensitized. In some systems it may be desirable to omit the secondary lens. A screen or stop may be used either for supporting the objective lens or may be placed between the objective lens and the secondary lens to prevent light rays which are projected through the film at areas, other than the restricted area within the conjugate focus of the objective lens, from reaching the light sensitive cell.

In the illustrated embodiment, Fig. 1 illustrates the arrangement of apparatus for the sound reproducing system according to this invention.

Figure 1:
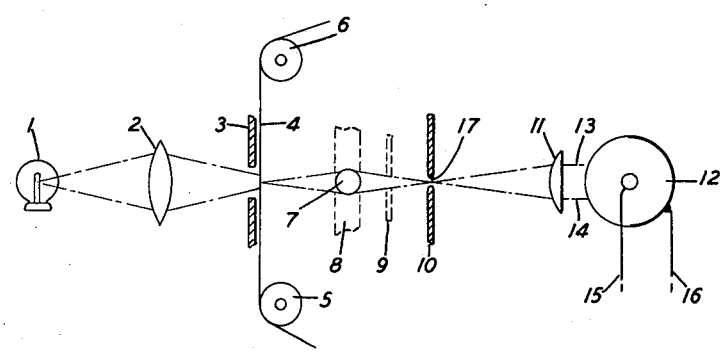
Figure 2:
Fig. 2 illustrates the preferred form of lens for use as an objective lens shown in Fig. 1.
Figure 3:
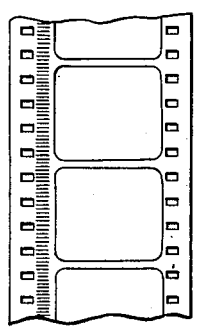
Fig. 3 shows a section of film with a sound record thereon suitable for use with a system constructed in accordance with this invention.

In the illustrated embodiment of Fig. 1, a lamp 1 is shown as a suitable light source. A condensing lens 2 is shown for concentrating light from said source upon an unrestricted portion of the film. In some reproducing devices it may be preferable to eliminate the lens 2 and position the lamp 1 approximately in the position of lens 2. The latter arrangement produces satisfactory results where the structure of the system permits the lamp to be located close to the film. A film support or gate is shown at 3 and may also be useful for heat dissipating purposes. The film 4 is of the type shown in Fig. 3 with sound and picture records thereon, or it may include only a sound record. The film 4 is maintained in constant motion by the constantly rotating sound sprocket 5. A guide roller 6 is used to guide the film from a suitable magazine into the film gate and through the light from the light source 1. The cylindrical lens 7 is spaced from the film a distance depending on the focal length of the lens. This lens may vary in diameter according to requirements and thus vary in its focal length. The preferred form of lens 7 is a round cylindrical rod of small diameter of the order of ⅛-inch or less. It has been found that in small rod lenses of this character, very little trouble is experienced from spherical aberration. The plane of the film is preferably in one conjugate focus at the lens 7. The area of the film in the conjugate focus of the lens 7 includes an illuminated portion of the film approximately one mil in height or dimension in the direction of travel of the film and of the width of the film sound record. A real image of this area of the film sound record is formed at the alternate conjugate focus of the lens which is represented at 17. A 1 to 1 ratio is shown between the conjugate foci of lens 7. This ratio need not, however, be maintained since it is not a requirement in carrying out the invention. The light rays from the cylindrical lens 7 are projected to a spherical lens 11 for defining the area of the light sensitive cell 12 to be sensitized. These rays are disclosed as parallel rays concentrated on a particular section of the light sensitive cell as shown by the outer rays 13 and 14. A real image is not formed at any position in the light ray area beyond the conjugate focus 17. An image is not required for properly exciting the light sensitive cell in accordance with the variations in translucency of the sound record.

Two of the particular requirements for optical systems for sound on film reproduction are that these optical systems must occupy a relatively small space and produce a line of light sharply defined. On the other hand the requirements of a sharply defined line of light demands lenses having small amounts of aberration, chromatic or spherical. The requirement in regard to aberration is more severe than for ordinary photographic objectives. In a direction perpendicular to the line of light, however, the system does not need to give a flat field since the size of the image is extremely small.

As a matter of comparison, an optical system using a simple plano-convex spherical lens may be assumed in which an object point on the axis of the lens will be imaged by the lens as a disc. This is usually designated as the circle of least confusion. This is true even though the object is so located with reference to the lens as to give a magnification factor of unity. The formation of the disc instead of a point image is the result primarily of aberrations in the lens. An image of a finite object will be diffused since the image is not built up of points corresponding to the points in the object, but of overlapping discs. If this same lens is decreased in diameter and its focal length proportionately decreased, the discs imaged of a point object will be decreased proportionately. Thus, if the diameter is made one-half as great, the disc will consequently be halved. An image of an object in this case would, therefore, be more sharply defined.

It is also well known that with a simple lens of this sort, the image of a plane object would lie on a curved surface. The screen, either real or imaginary, on which the image falls would have to be curved in order to show all parts well defined unless a very small part of the image is viewed at a time.

A corresponding condition obtains in the case of a cylindrical lens except that in place of a disc image of a point source, a band of light of approximately the same width as the diameter of the disc is obtained. The width of this band due to aberrations can be reduced commensurate with the decrease in size and focal length of the lens at the expense of flatness of field.

Optical systems for sound reproduction are not required to give a flat field since the field is so small. It is, however, of great importance that the effects of aberration be kept down to a small value. In many optical problems, flatness of field has been, in general, a prime consideration, and therefore combinations of relatively large and expensive lenses have been used to reduce aberration. Different types of glass have been devised for this purpose. It has been found that the same results can be produced with a very small cylinder lens of very short focal length if properly organized in an optical system. This cylinder lens can be a very cheap lens such as a glass rod. If it is sufficiently small, such as approximately ⅛" in diameter or less, it will produce a very sharply defined line of light and will be satisfactorily limited in both chromatic and spherical aberration.

In a system of this character a stop or screen such as 8, 9 or 10 is required in order to prevent light rays from the light source 1 which pass through unrestricted areas of the film, from reaching the light sensitive cell 12. A stop of this character may be used for supporting the objective lens 7 as shown at 8. It may alternatively be used at any point between lens 7 and lens 11 as shown by the screens 9 and 10. The only requirement for this screen is that its inner edges be positioned so as to cut off all light rays which do not emanate from the selected area within the primary conjugate focus of the lens.

The adjustment of a lens of this type is much less delicate than lenses of other types such as spherical lenses which must have their spherical and flat surfaces positioned very accurately with relation to the object. Since the curvature of the rod lens such as 7 is the same on both focusing surfaces it requires adjustment only of its longitudinal physical axis with relation to the object. In a rod of small diameter less light is absorbed and a greater angle of light is obtained in the plane perpendicular to the axis of the rod for the same dimension as compared to other lenses. This increases the amount of useful light which can pass through the lens.

The light rays transmitted to the light sensitive cell 12 in accordance with the variations in translucency of the film sound record are transformed into correspondingly varying electric currents. These electric currents are transmitted over conductors 15 and 16 to an amplifier and loud speaker, not shown, for the reproduction of sounds recorded on the film.

What is claimed is:

1. Apparatus for reproducing sounds recorded photographically on a film comprising means for continuously moving a film having a sound record thereon, a light source of substantially constant intensity for illuminating an unrestricted area of said film sound record, a light sensitive cell, a screen having a slit therein, a simple round elongated objective lens in the form of a cylinder less than ⅛" in diameter of negligible chromatic and spherical aberration, mounted with its axis transverse with respect to the direction of movement of the film and so that light is refracted by the entire vertical extent of the lens and so positioned with relation to the film and slit that a real image of the sound record formed by light refracted through said entire vertical extent of the lens appears within the area of said slit, said cell being so positioned that the light rays extending through the focal position of said image impinge on said cell, said screen only absorbing light rays not focussed by said objective lens.

2. Apparatus for reproducing sounds recorded photographically on a film comprising means for continuously moving a film having a sound record thereon, a light source of substantially constant intensity for illuminating an unrestricted area of said film sound record, a light sensitive cell, a screen having a slit therein, a simple round elongated objective lens in the form of a cylinder less than ⅛" in diameter of negligible chromatic and spherical aberration mounted with its axis transverse with respect to the direction of movement of the film and so that light is refracted by the entire vertical extent of the lens and so positioned with relation to the film and slit that a real image of the sound record is formed by light refracted through said entire vertical extent between said lens and said light sensitive cell, said cell being so positioned that the light rays extending through the focal position of said image impinge upon said cell, said screen only absorbing light rays not focussed by said objective lens.

EDWARD C. WENTE.